(12) United States Patent
Hassan et al.

(10) Patent No.: US 10,610,948 B2
(45) Date of Patent: Apr. 7, 2020

(54) TWO-PIECE NOZZLE ASSEMBLY FOR AN ARC WELDING APPARATUS

(71) Applicant: Victor Equipment Company, Denton, TX (US)

(72) Inventors: Khalid Hassan, Denton, TX (US); Glenn K. Redding, Flower Mound, TX (US)

(73) Assignee: Victor Equipment Company, Denton, TX (US)

( * ) Notice: Subject to any disclaimer, the term of this patent is extended or adjusted under 35 U.S.C. 154(b) by 71 days.

(21) Appl. No.: 14/540,130

(22) Filed: Nov. 13, 2014

(65) Prior Publication Data

US 2016/0082540 A1 Mar. 24, 2016

Related U.S. Application Data

(60) Provisional application No. 62/053,784, filed on Sep. 22, 2014.

(51) Int. Cl.

| | | |
|---|---|---|
| *B23K 9/32* | (2006.01) | |
| *B23K 9/28* | (2006.01) | |
| *B23K 9/12* | (2006.01) | |
| *B23K 9/16* | (2006.01) | |
| *B23K 9/173* | (2006.01) | |
| *B23K 9/26* | (2006.01) | |
| *B23K 9/29* | (2006.01) | |

(52) U.S. Cl.
CPC .............. *B23K 9/123* (2013.01); *B23K 9/164* (2013.01); *B23K 9/173* (2013.01); *B23K 9/26* (2013.01); *B23K 9/295* (2013.01); *B23K 9/32* (2013.01)

(58) Field of Classification Search
CPC ........ B23K 9/123; B23K 9/164; B23K 9/173; B23K 9/26; B23K 9/295
USPC ........................................ 219/137.31–137.62
See application file for complete search history.

(56) References Cited

U.S. PATENT DOCUMENTS

| | | |
|---|---|---|
| 1,828,459 A | 10/1931 | Cornell et al. |
| 1,835,179 A | 12/1931 | Rue et al. |
| 2,427,894 A | 9/1947 | Benner |

(Continued)

FOREIGN PATENT DOCUMENTS

| | | |
|---|---|---|
| CN | 2564298 Y | 8/2003 |
| CN | 1490110 A | 4/2004 |

(Continued)

OTHER PUBLICATIONS

Japanese-English machine translation of JP 07-256462.*

(Continued)

*Primary Examiner* — Michael Hoang
(74) *Attorney, Agent, or Firm* — Edell, Shapiro & Finnan, LLC

(57) ABSTRACT

A nozzle assembly for a welding torch and a welding torch including said nozzle assembly is provided. The nozzle assembly generally comprises a base defining a distal threaded portion for securing the nozzle assembly to a distal end portion of a conductor tube of the welding torch, the base defining a distal threaded portion and a nose defining a mating threaded portion adapted to engage the distal threaded portion of the base, thereby removably securing the nose to the base. The distal threaded portion may comprise tapered Edison threads or a shell thread design.

16 Claims, 11 Drawing Sheets

(56) References Cited

U.S. PATENT DOCUMENTS

| | | | |
|---|---|---|---|
| 2,432,639 A | 12/1947 | Webster et al. | |
| 2,438,292 A | 3/1948 | Linker et al. | |
| 2,493,127 A | 1/1950 | Franck | |
| 2,544,801 A * | 3/1951 | Muller | B23K 9/173 219/137.42 |
| 2,944,525 A | 7/1960 | Fagge | |
| 3,018,360 A | 1/1962 | Engel et al. | |
| 3,086,575 A | 4/1963 | Kowal | |
| 3,466,707 A | 9/1969 | Click | |
| 3,629,547 A | 12/1971 | Kester et al. | |
| 3,783,233 A | 1/1974 | dal Molin | |
| 4,105,891 A | 8/1978 | Hill et al. | |
| 4,158,763 A | 6/1979 | Moerke | |
| 4,158,765 A | 6/1979 | Moerke | |
| 4,223,545 A | 9/1980 | Tucholski | |
| 4,467,175 A | 8/1984 | Reeh et al. | |
| 4,554,432 A | 11/1985 | Raloff | |
| 4,779,441 A | 10/1988 | Pringle | |
| 4,994,707 A * | 2/1991 | Stark | H01K 1/40 313/269 |
| 5,491,321 A | 2/1996 | Stuart | |
| 5,669,556 A | 9/1997 | Yoshida | |
| 5,974,917 A | 11/1999 | Way | |
| 5,998,760 A | 12/1999 | Kunz | |
| 7,576,300 B2 * | 8/2009 | Giese | B23K 9/123 219/137.61 |
| 7,578,161 B1 | 8/2009 | Sizemore | |
| 7,905,741 B1 | 3/2011 | Wade et al. | |
| 9,889,519 B2 | 2/2018 | Hassan | |
| 2004/0026394 A1 | 2/2004 | Giese | |
| 2004/0079784 A1 * | 4/2004 | Giese | B23K 9/295 228/44.3 |
| 2005/0109738 A1 | 5/2005 | Hewett et al. | |
| 2007/0062922 A1 | 3/2007 | Zamuner | |
| 2007/0108173 A1 | 5/2007 | Zamuner | |
| 2007/0210049 A1 | 9/2007 | Dingeldein | |
| 2007/0215587 A1 | 9/2007 | Centner | |
| 2008/0035623 A1 * | 2/2008 | Hutchison | B23K 9/123 219/136 |
| 2008/0035626 A1 | 2/2008 | Christopher et al. | |
| 2008/0188093 A1 | 8/2008 | Jaeger | |
| 2008/0290074 A1 | 11/2008 | Speker et al. | |
| 2009/0050609 A1 | 2/2009 | Berger et al. | |
| 2010/0123311 A1 | 5/2010 | Church | |
| 2011/0000893 A1 | 1/2011 | Blankenship et al. | |
| 2011/0006522 A1 | 1/2011 | Bichler et al. | |
| 2012/0167654 A1 | 7/2012 | Kenny | |
| 2013/0126504 A1 * | 5/2013 | Hassan | B23K 9/173 219/137.42 |
| 2013/0134143 A1 | 5/2013 | Hassan et al. | |
| 2013/0240496 A1 * | 9/2013 | Kinder | B23K 9/323 219/138 |
| 2014/0263253 A1 | 9/2014 | Meess et al. | |

FOREIGN PATENT DOCUMENTS

| | | | | |
|---|---|---|---|---|
| CN | 1491767 A | 4/2004 | | |
| CN | 201902729 U | 7/2011 | | |
| CN | 203418216 U | 2/2014 | | |
| CN | 203566059 U | 4/2014 | | |
| CN | 103998174 A | 8/2014 | | |
| DE | 231519 A1 | 1/1986 | | |
| DE | 4143181 C1 | 5/1993 | | |
| JP | S60-71482 U | 5/1985 | | |
| JP | S60-170574 A | 9/1985 | | |
| JP | H07256462 A | 10/1995 | | |
| JP | 2004276084 A | 10/2004 | | |
| JP | 2004-322127 A | 11/2004 | | |
| JP | 2009-142850 A | 7/2009 | | |
| KR | 2012-0000369 U | 1/2012 | | |
| KR | 2012-0081460 A | 7/2012 | | |
| KR | 2020130000723 U | 1/2013 | | |
| KR | 1020140005654 A | 1/2014 | | |
| WO | WO 0198013 A1 * | 12/2001 | | H05H 1/34 |
| WO | 2013157036 A1 | 10/2013 | | |

OTHER PUBLICATIONS

International Search Report and Written Opinion dated Apr. 14, 2015 for International Application No. PCT/US2014/065577 filed Nov. 13, 2014.

Internati/onal Search Report and Written Opinion dated Apr. 1, 2015 for International Application No. PCT/US2014065353 filed Nov. 13, 2014.

International Search Report and Written Opinion dated Apr. 1, 2015 for International Application No. PCT/US2014/065566 filed Nov. 13, 2015.

International Search Report and Written Opinion dated Mar. 18, 2015 for International Application No. PCT/US2015/065340 filed Nov. 13, 2014.

International Search Report and Written Opinion dated Apr. 1, 2015 for International Application No. PCT/US2014/065351 filed Nov. 13, 2014.

International Search Report and Written Opinion dated Mar. 6, 2015 for International Application No. PCT/US2014/065504 filed Nov. 13, 2014.

International Search Report and Written Opinion dated Mar. 25, 2015 for International Application No. PCT/US2014/065346 filed Nov. 13, 2014.

International Search Report and Written Opinion dated Apr. 1, 2015 for International Application No. PCT/US2014/065487 filed Nov. 13, 2014.

International Search Report and Written Opinion dated Feb. 29, 2016 for PCT/US2015/060377 filed Nov. 12, 2015.

International Preliminary Report and Written Opinion on Patentability for PCT/US2014/065353 dated Mar. 28, 2017.

Canadian Office Action from corresponding Canadian Application No. 2,928,856 dated Apr. 4, 2017 (4 pages).

Canadian Office Action from corresponding Canadian Application No. 2,961,150 dated Mar. 21, 2018(3 pages).

Chinese Office Action with English translation in counterpart Chinese Patent Application No. 201480082138.9, dated, Sep. 27, 2018.

* cited by examiner

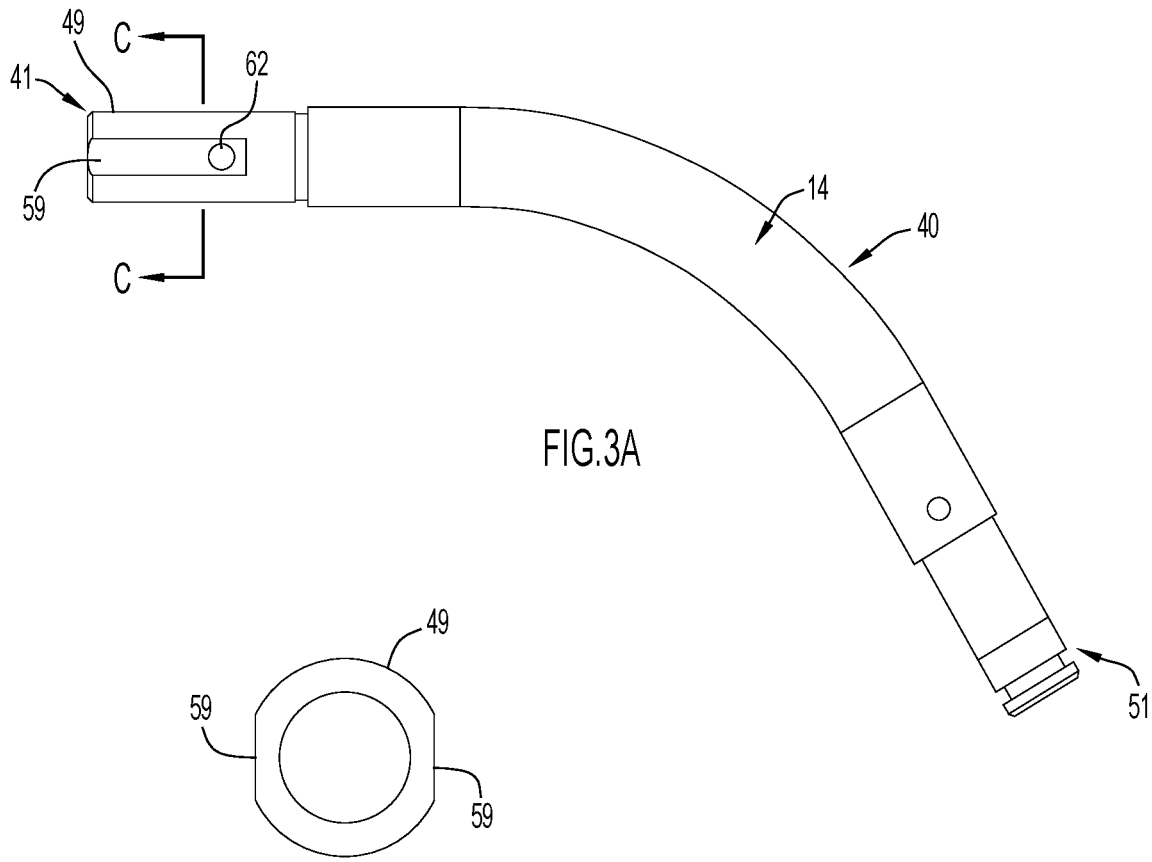
FIG.3A
FIG.3C
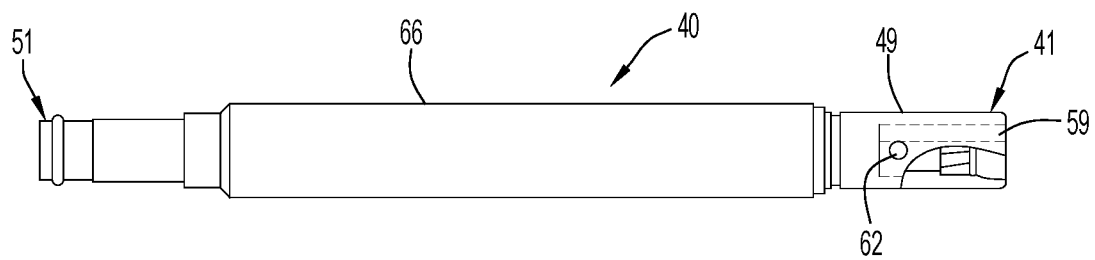
FIG.3B

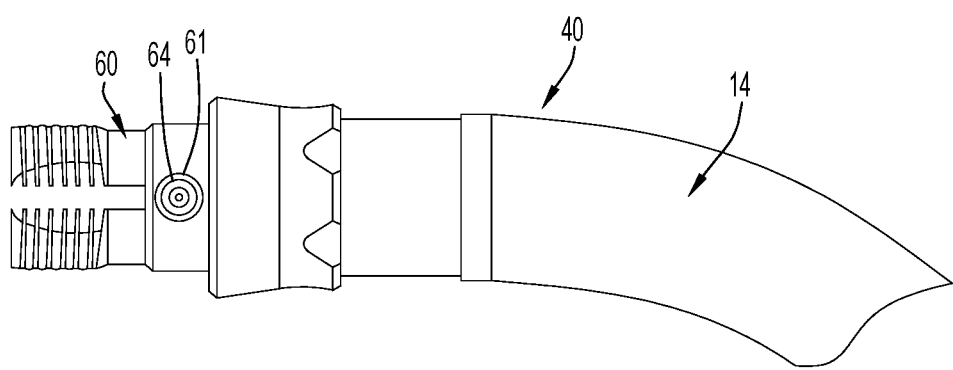
FIG.4
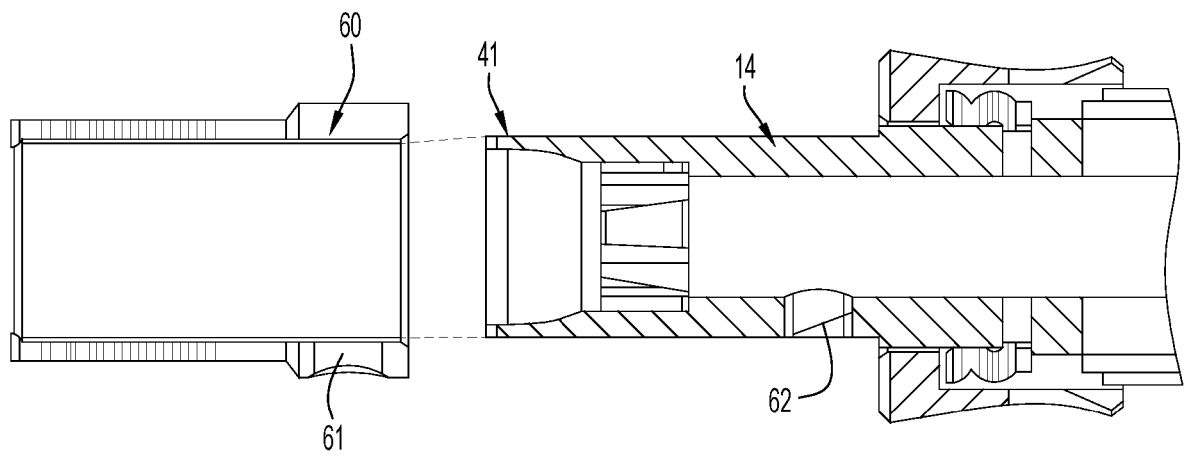
FIG.5
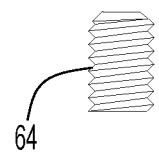

TWO-PIECE NOZZLE ASSEMBLY FOR AN ARC WELDING APPARATUS

CROSS-REFERENCE TO RELATED APPLICATIONS

This application claims the benefit of provisional application Ser. No. 62/053,784, filed on Sep. 22, 2014. The disclosure of the above application is incorporated herein by reference in its entirety.

FIELD

The present disclosure relates generally to welding apparatuses, and more particularly to arc welding apparatuses such as Metal Inert Gas (MIG) or Gas Metal Arc Welding (GMAW) welding guns, including consumables for generating a welding arc and diffusing a shield gas.

BACKGROUND

The statements in this section merely provide background information related to the present disclosure and may not constitute prior art.

In an arc welding apparatus, such as Metal Inert Gas (MIG) or Gas Metal Arc Welding (GMAW) welding gun, a welding wire is fed through the welding gun to provide a molten metal pool to join metal work pieces together. An inert gas is directed through the front (distal) end of the welding gun to provide a surrounding layer or blanket of shielding gas to protect the molten metal pool from atmospheric contamination. The inert gas is typically a combination of various gases such as argon or helium, among others.

A prior art MIG or GMAW welding gun typically includes a contact tip and a gas diffuser connected to the contact tip. The contact tip has a central bore to guide the welding wire to the work pieces. The contact tip transfers electrical current to the welding wire. The contact tip is typically threaded into the gas diffuser and the gas diffuser defines gas passageways that direct the shielding gas around the contact tip. The contact tip and gas diffuser are constantly subjected to high heat and are susceptible to wear due to high temperature operation. A nozzle assembly surrounds the contact tip and gas diffuser. The nozzle assembly further directs the shielding gas towards the work pieces to blanket the molten metal pool.

SUMMARY

The present disclosure generally provides a nozzle assembly for a welding torch that comprises a base defining a distal threaded portion for securing the nozzle assembly to a distal end portion of a conductor tube of the welding torch and a nose defining a mating threaded portion adapted to engage the distal threaded portion of the base, thereby removably securing the nose to the base. The distal threaded portion may comprise tapered Edison threads or a shell thread design.

According to one aspect of the present disclosure, the distal threaded portion provides an air seal and a tortuous path between the base and the nose in order to reduce the possibility of air intrusion. The base secures a contact tip into a position desired for operation of the welding torch. The nose is interchangeable with another nose having a different length, diameter, configuration, or interior geometry selected to properly direct a shield gas in a specific welding operation.

According to another aspect of the present disclosure, an arc welding apparatus is provided. The arc welding apparatus comprises a handle, a conductor tube attached to the handle, and a consumable assembly attached to the conductor tube. The consumable assembly comprises both a contact tip and the nozzle assembly as previously described above and further defined herein. The nozzle assembly comprises a base defining a distal threaded portion for securing the nozzle assembly to a distal end portion of a conductor tube of the welding torch and a nose defining a mating threaded portion adapted to engage the distal threaded portion of the base, thereby removably securing the nose to the base.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3A is a side view of the conductor tube constructed in accordance with the teachings of the present disclosure;

FIG. 3B is a side view of another form of the conductor tube constructed in accordance with the teachings of the present disclosure;

FIG. 3C is a cross-sectional view of the conductor tube of FIG. 3A taken along line C-C;

FIG. 4 is partial side view of a conductor tube assembly constructed in accordance with the teachings of the present disclosure;

FIG. 5 is a partial side cross-sectional view of the conductor tube assembly of FIG. 4;

DETAILED DESCRIPTION

Figure 1:
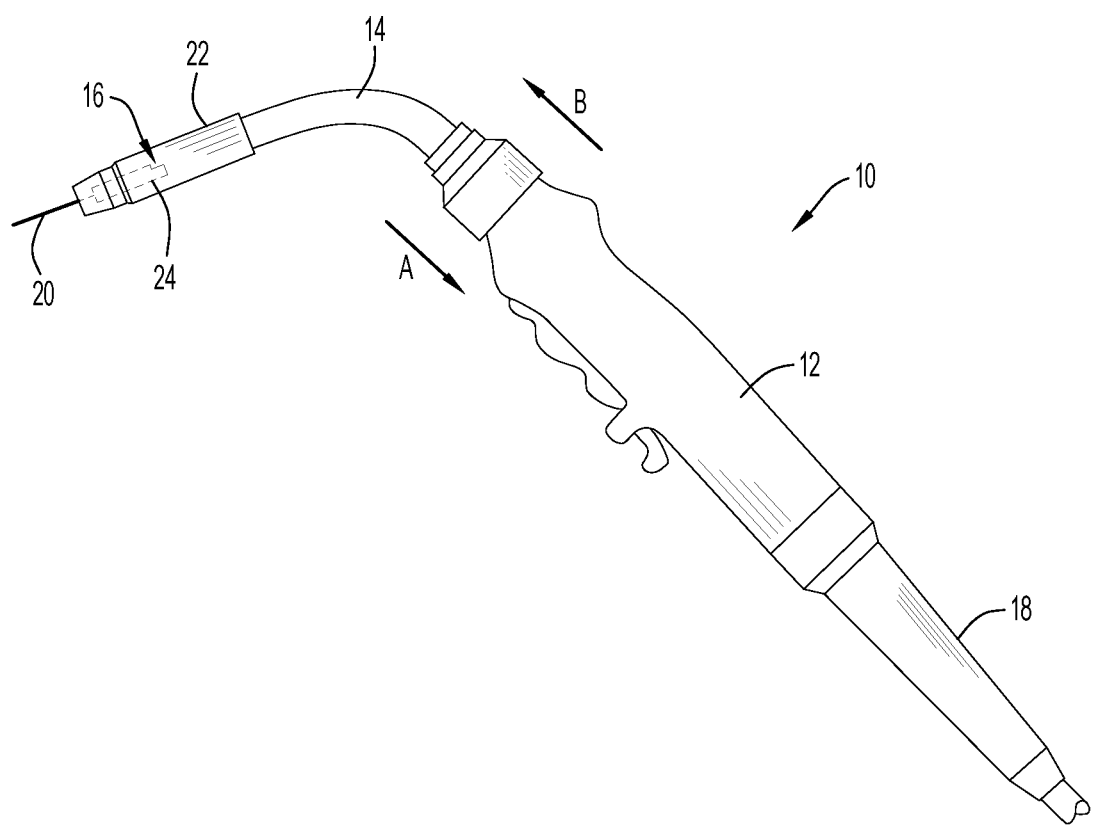
FIG. 1 is a side view of an arc welding apparatus.

The following description is merely exemplary in nature and is not intended to limit the present disclosure, application, or uses. It should be understood that throughout the drawings, corresponding reference numerals indicate like or corresponding parts and features. Although the term "MIG" and "GMAW" are used within the specification, it should be understood that the teachings of the present disclosure apply to any type of welding or cutting apparatus.

Referring to FIG. 1, an arc welding apparatus, such as a MIG or GMAW welding gun, is illustrated and generally indicated by reference numeral 10. The MIG welding gun 10 includes a handle 12, a conductor tube 14 attached to the handle 12, and a consumable assembly 16 attached to the conductor tube 14. The handle 12 is connected to a welding cable 18 that carries welding current, shielding gas, and a welding wire 20 from a power source (not shown), a gas source (not shown), and a wire feeder (not shown) to the welding gun 10.

The consumable assembly 16 includes a plurality of consumable components including a nozzle assembly 22 and a contact tip 24. The structure and operation of an exemplary arc welding apparatus has been disclosed in U.S. Pat. Nos. 5,491,321 and 5,338,917, which are commonly owned by the assignee of the present application, and the contents of which are incorporated herein by reference in their entirety. In addition, the structure and operation of the arc welding apparatus 10 incorporating a contact tip that provides for the function as a contact tip and a diffuser has been disclosed in related U.S. Published Application No. 2013/0126506, which is commonly owned by the assignee of the present application, and the contents of which are incorporated herein by reference in their entirety.

Figure 2:
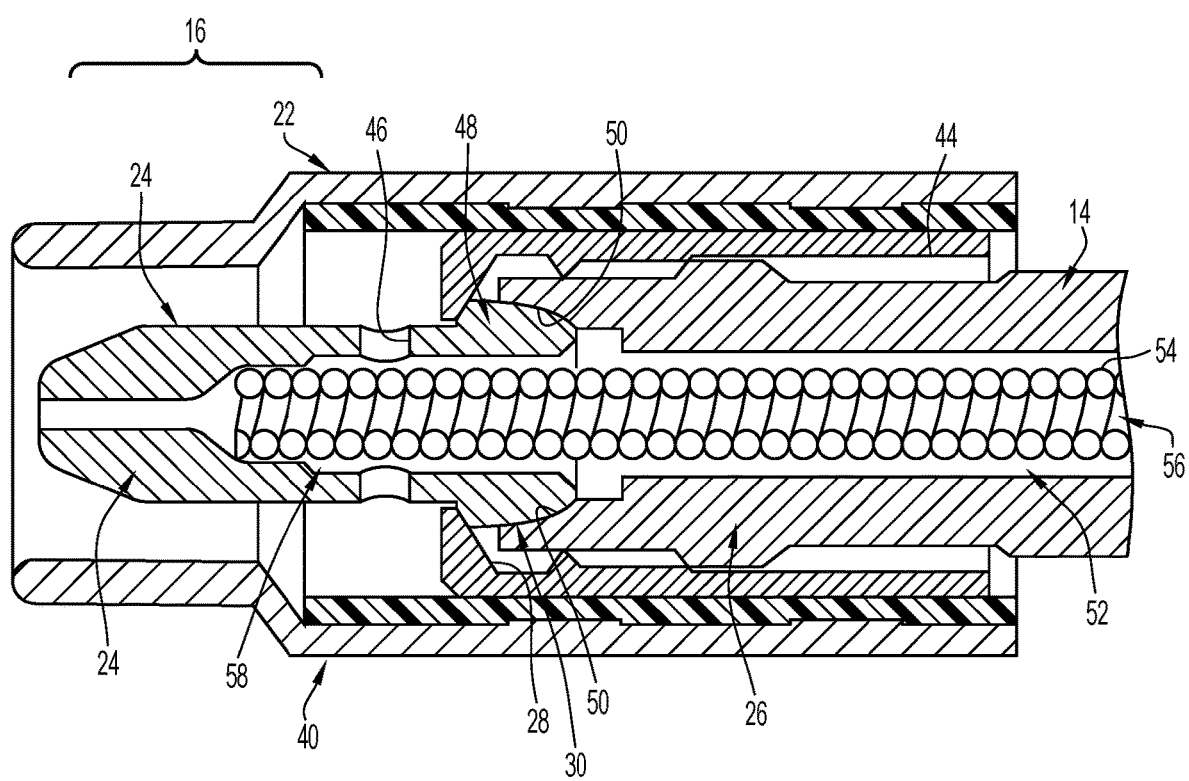
FIG. 2 is a cross-sectional view of a consumable assembly and a conductor tube assembly constructed in accordance with the teachings of the present disclosure.

Referring to FIG. 2, the consumable assembly 16 is connected to a distal end portion 26 of the conductor tube 14. A nozzle assembly 22 is substantially cylindrical in one form and receives the distal end portion 26 of the conductor tube 14 therein. In one form, a contact tip 24 is coaxially disposed inside the nozzle assembly 22, which has a seating surface 28 that is configured to mate with an end portion 30 (which in one form is spherical as shown, but could be any shape including a linear or polynomial taper) of the contact tip 24 into the distal end portion 26 of the conductor tube 14.

In one form the nozzle assembly 22 is secured onto the distal end 26 of the conductor tube assembly 40, and the contact tip 24 engages the seating surface 28 of a nozzle insert 44. As the nozzle assembly 22 is tightened onto the conductor tube assembly 40, the seating surface 28 engages against the shoulder 46 of the contact tip 24, thereby urging the spherical tapered end 48 of the contact tip 24 into the spherical tapered seat 50 of the conductor tube 14. The nozzle insert 44 tightens onto the conductor tube assembly 40 and the spherical tapered end 48 of the contact tip 24 is secured into engagement with the tapered seat 50.

The conductor tube 14 defines an internal passageway 52, and a conduit liner 54 is disposed within the internal passageway 52 as shown. The conduit liner 54 has a guiding channel 56 for guiding the welding wire 20 (not shown) to the contact tip 24. The conduit liner 54 may extend into an internal cavity 58 of the contact tip 24. The positioning of the conduit liner 54 within the internal cavity 58 provides a continuous guiding channel 56 for directly feeding the welding wire into the contact tip 24. Proper positioning of the conduit liner 54 within the contact tip 24, or "stick-out" relative to the distal end portion 26 of the conductor tube 14, is a factor for the correct operation of the welding torch 10. The conduit liner 54 directs the welding wire 20 through the welding cable 18, torch 10, conductor tube 14, and into the contact tip 24.

Additional aspects of the location and features of the conduit liner 54 within the internal cavity 58 of the contact tip 24 has been disclosed in U.S. Published Application No. 2013/0126504 A1, which is commonly owned by the assignee of the present application, and the contents of which are incorporated herein by reference in their entirety.

Referring to FIGS. 3A-3C, the conductor tube 14 can define a variety of geometries, and, a curved geometry of various degrees is used depending on the application requirements. The conductor tube 14 alternatively could be straight or flexible and configurable as has been disclosed in U.S. Published Application No. 2007/0284354, which is commonly owned by the assignee of the present application, and the contents of which are incorporated herein by reference in their entirety. The conductor tube assembly 40 extends a length between its distal end 41 and its proximal end 51. The proximal end 51 is adapted to be secured to the handle 12 of the welding gun 10, and the distal end 41 of the conductor tube 14 is adapted to receive the consumable assembly 16 (as shown in FIG. 1).

The distal end 41 of the conductor tube 14 provides unique features to allow for an efficient and robust connection with the consumable assembly 16, the nozzle assembly 22, and the contact tip 24. For example, in one form, the distal end 41 has an outer surface 49 that includes two opposing flat faces 59, that allows for an anti-rotational engagement with a sleeve (not shown). Additionally, in another form, the distal end 41 has a threaded opening 62 through at least one of the flat faces 59 for securing the sleeve.

The conductor tube 14 is typically made from a copper alloy or other metal that has conductive properties and then is coated with an insulation material, which in one form may be silicone, and finally covered with a tube jacket 66 to provide durability and additional insulation from the electric current, which flows through the conductor tube 14 during operation of the welding gun 10. The tube jacket 66 by way of example may be made from a brass or stainless steel metal or alloy in one form of the present disclosure.

The distal end 41 of the conductor tube 14 provides unique features to allow for an efficient and robust connection with the consumable assembly 16, the nozzle assembly 22, and the contact tip 24. For example, in one form, the distal end 41 has an outer surface 49 that includes two opposing flat faces 59, that allows for an anti-rotational engagement with a sleeve 60.

As shown in FIGS. 4 and 5, the conductor tube assembly 40 includes the sleeve 60 that slides over the profile of the outer surface 49 of the conductor tube 14, as previously set forth. The sleeve 60 is secured to the conductor tube 14 in one form by the set screw 64 that is engaged through a threaded aperture 61 of the sleeve 60. The threaded aperture 61 is aligned with the threaded opening 62 of the conductor tube 14, and the set screw 64 removably secures the sleeve 60 in position over the distal end 48 of the conductor tube 42.

Figure 6:
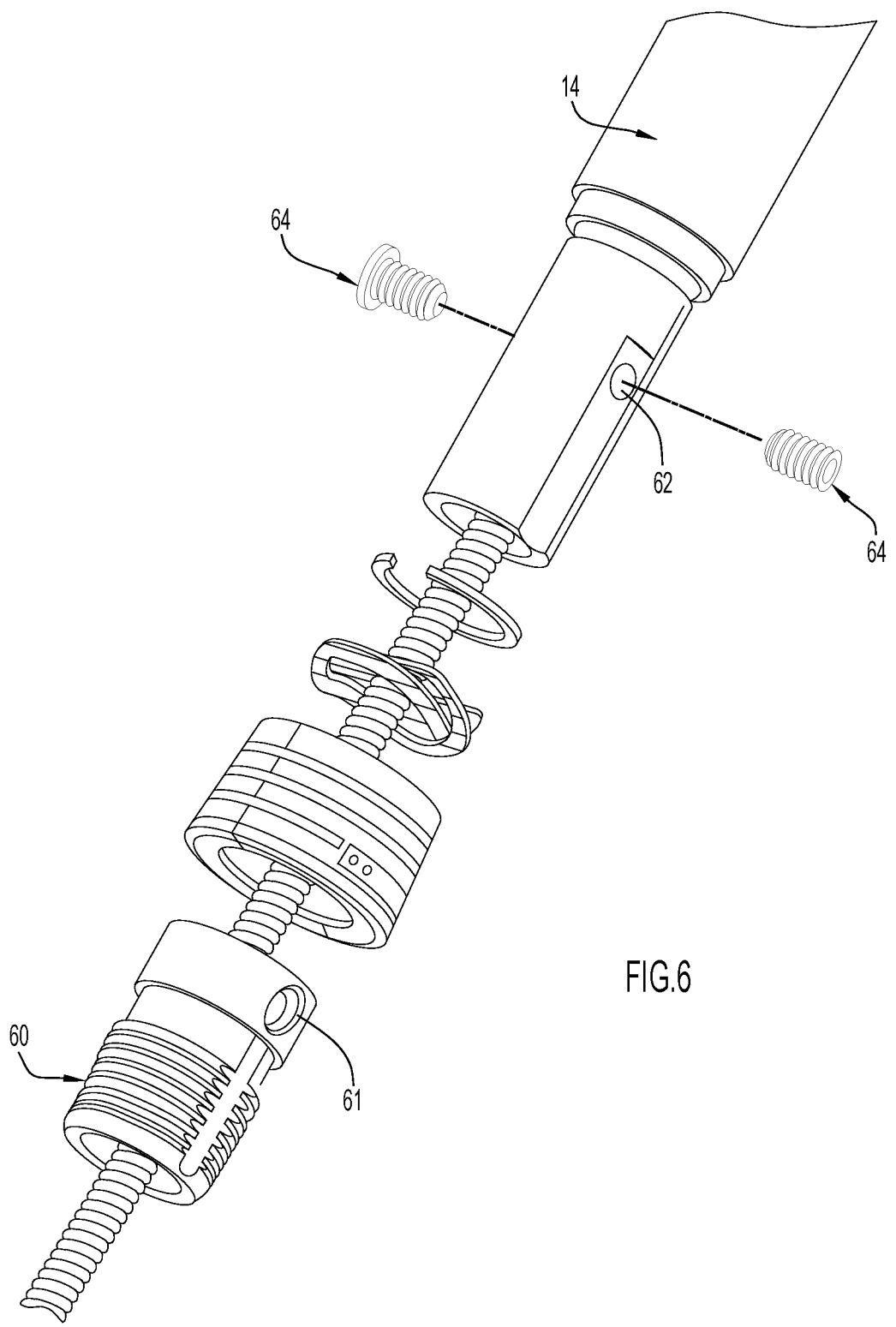
FIG. 6 is a perspective exploded view of another form of a conductor tube assembly constructed in accordance with the teachings of the present disclosure.
Figure 7:
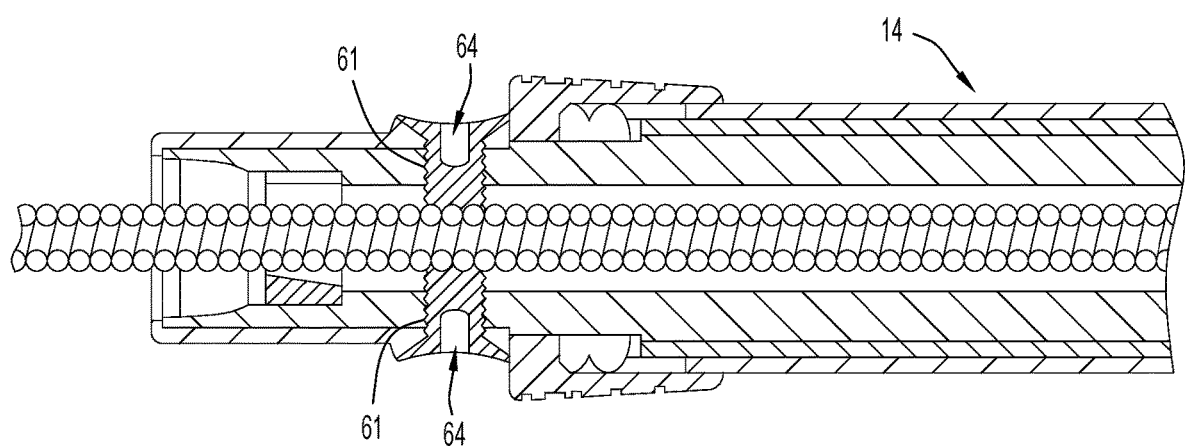
FIG. 7 is an enlarged partial side cross-sectional view of the conductor tube assembly of FIG. 6.

Referring to FIGS. 6 and 7, the sleeve 60 in another form of the present disclosure may optionally include a second threaded aperture 61 and a second set screw 64. In this form, the set screws may be used to clamp and secure the conduit liner in a desired position within the conductor tube for maintaining the desired trim distance. The set screws 64 are generally positioned on opposing sides of the conduit liner 54 and can be threaded to impose a clamping force against the conduit liner 54. The clamping force secures the conduit liner 54 in position within the conductor tube 14 during operation of the welding torch 10. However, it is further contemplated that additional set screw arrangements in other orientations around the conductor tube may be used to further secure the conduit liner in position within the conductor tube.

Figure 8:
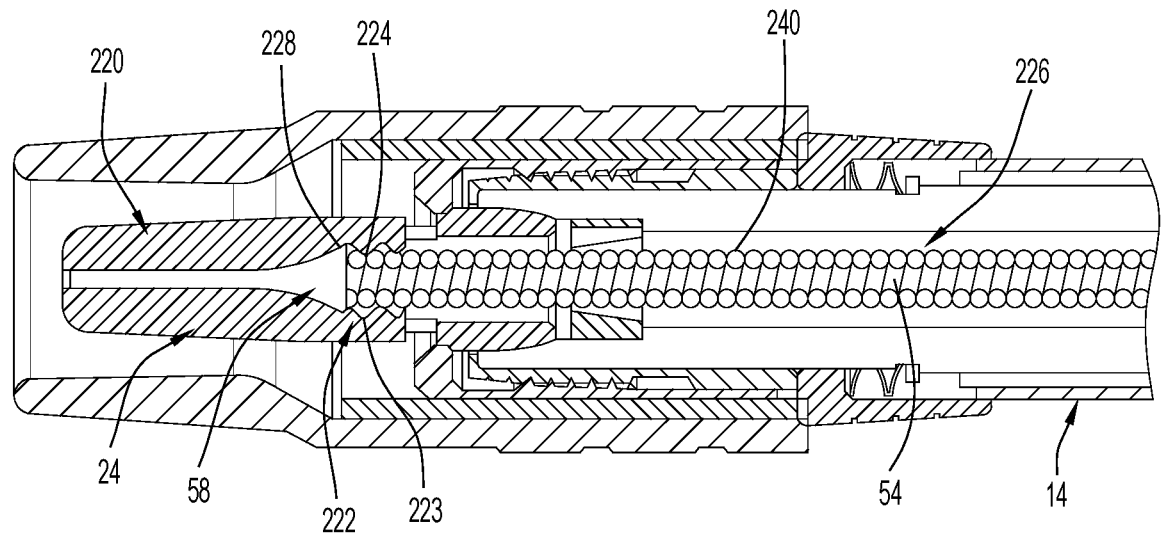
FIG. 8 is a side cross-sectional view of another form of a consumable component having integral engagement means for engaging a conduit liner and constructed in accordance with the teachings of the present disclosure.

FIG. 8, in another form of the present disclosure, the conduit liner 54 may also be secured by a means within a consumable component 220. In this form of the present disclosure, consumable component 220 is the contact tip 24. The contact tip 24 may include an integral engagement means 222 within the internal cavity. The integral engagement means 222 provides a structure that can grip and secure the conduit liner 54. More specifically, the internal engagement means 222 in this form defines ridges 223 and grooves 224 that engage corresponding portions of the conduit liner 54 as shown. As used herein, the term "integral engagement means" shall be construed to mean a geometric feature, or features, that are integral to or a feature of the consumable component 220 without additional or external components/parts. Accordingly, no additional parts or components are required to secure the conduit liner 54 within the consumable component 220 in this form of the present disclosure.

The conduit liner 54 in many applications is formed by a helically wound wire 240. The wound wire 240 may have various cross-sections, such as square, oval, circular or various other geometric cross-sections. As shown, the conduit liner 54 is formed by wound wire 240 having a generally circular cross-section. Each wound wire results in the conduit liner 54 having an exterior surface 226 that may have a generally threaded geometry. The ridges 223 and grooves 224 engage the helically wound wire 240 of the conduit liner 54, and in one form, the conduit liner 54 can be "threaded" into the integral engagement means 222. The integral engagement means 222 may further include a stop surface 228 within the internal cavity 58 of the contact tip 24 to provide a haptic indication to the user that the conduit liner 54 is secured at the desired position and/or location within the internal cavity 58. It should be appreciated that the integral engagement means 222 and the conduit liner 54 may be of various designs to engage and allow the engagement means 222 to secure the conduit liner 54 within the consumable component 220. It is also contemplated that the consumable component 220 includes other components such as a diffuser, the sleeve 234, or other consumable component secured to the conductor tube 14 and/or in proximity with the conduit liner 54. The ridges 223 and grooves 224 are merely exemplary and should not be construed as limiting the scope of the present disclosure.

Figure 9:
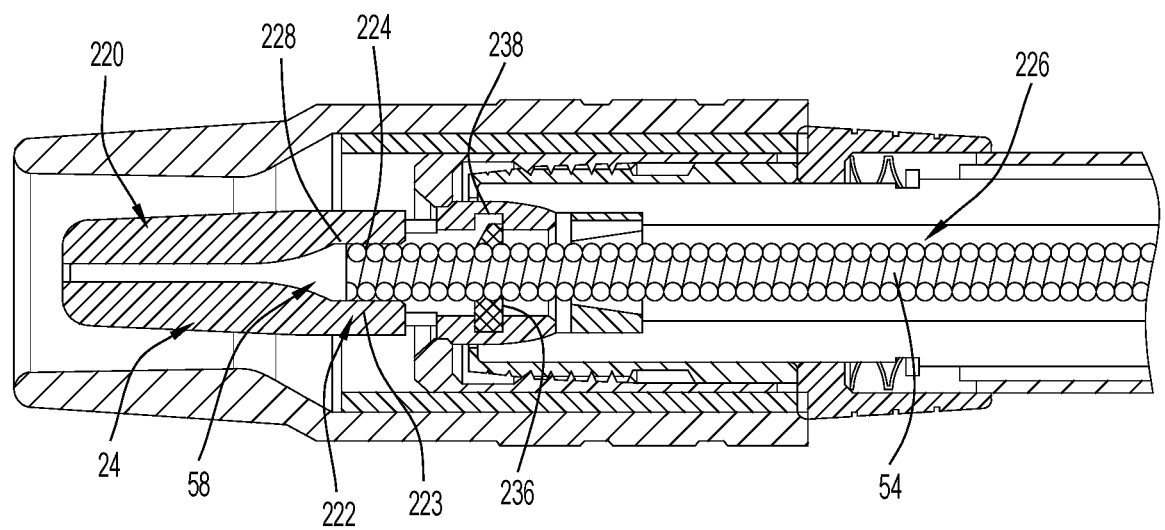
FIG. 9 is a side cross-sectional view of another form of a consumable component having integral engagement means for engaging a conduit liner and constructed in accordance with the teachings of the present disclosure.
Figure 10:
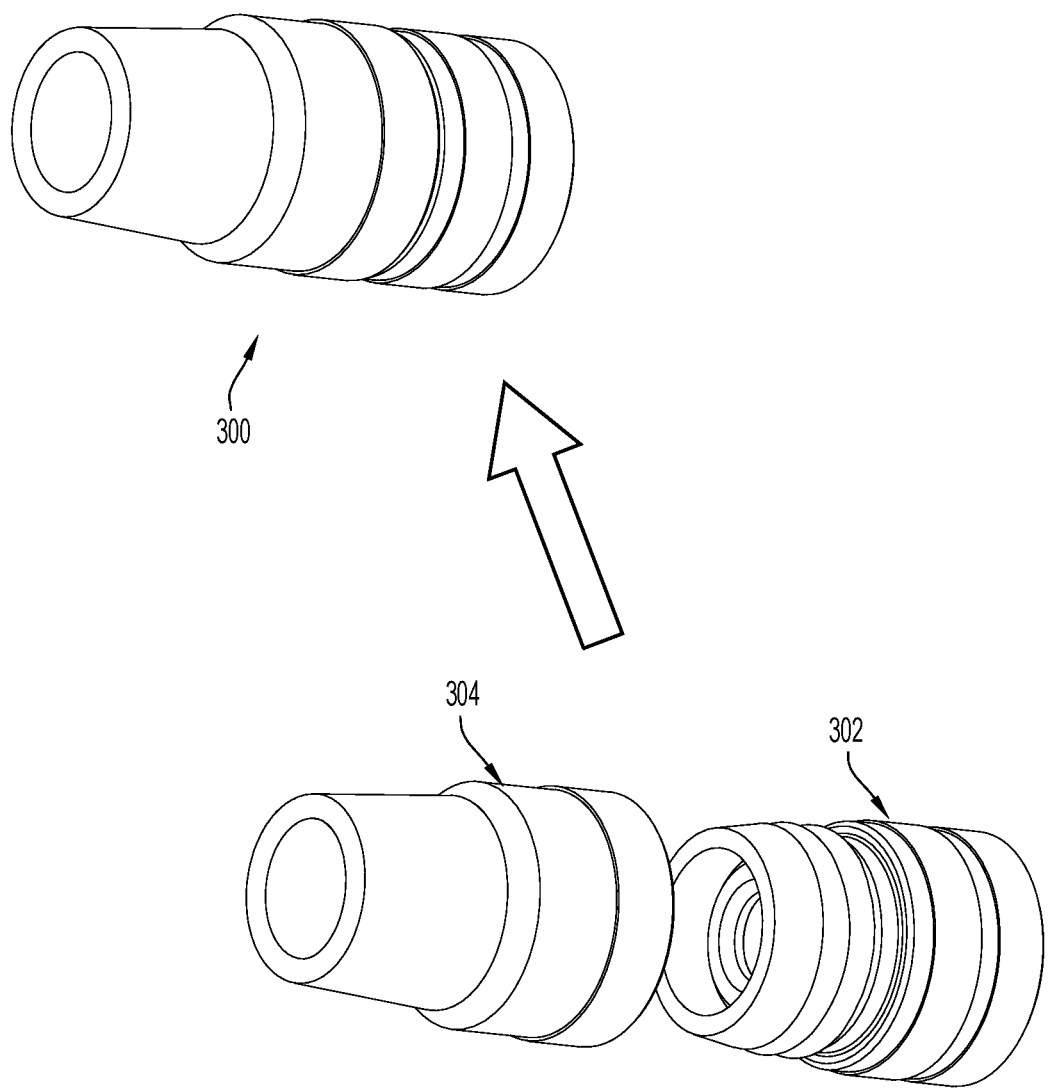
FIG. 10 is a perspective view and an exploded view of another form of a nozzle assembly constructed in accordance with the teachings of the present disclosure.
Figure 11:
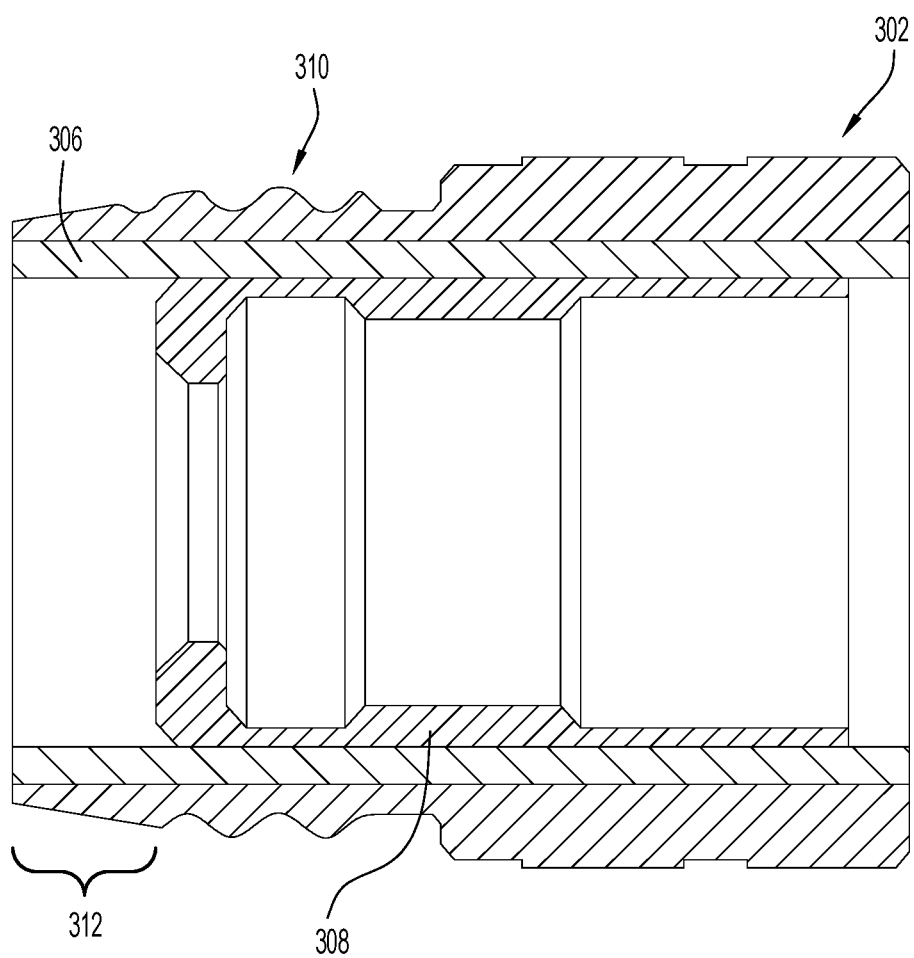
FIG. 11 is a cross-sectional view of a base of the nozzle assembly of FIG. 10.
Figure 12:
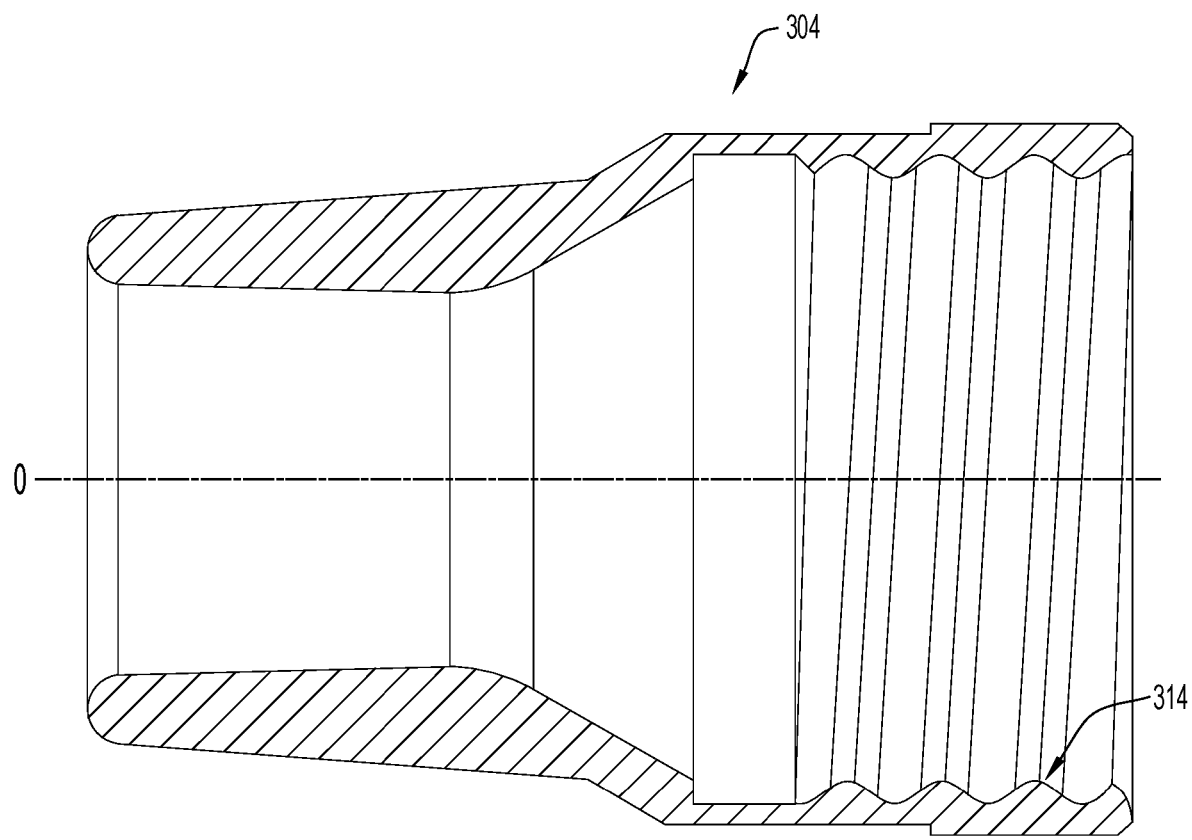
FIG. 12 is a cross-sectional view of a nose of the nozzle assembly of FIG. 10.
Figure 13:
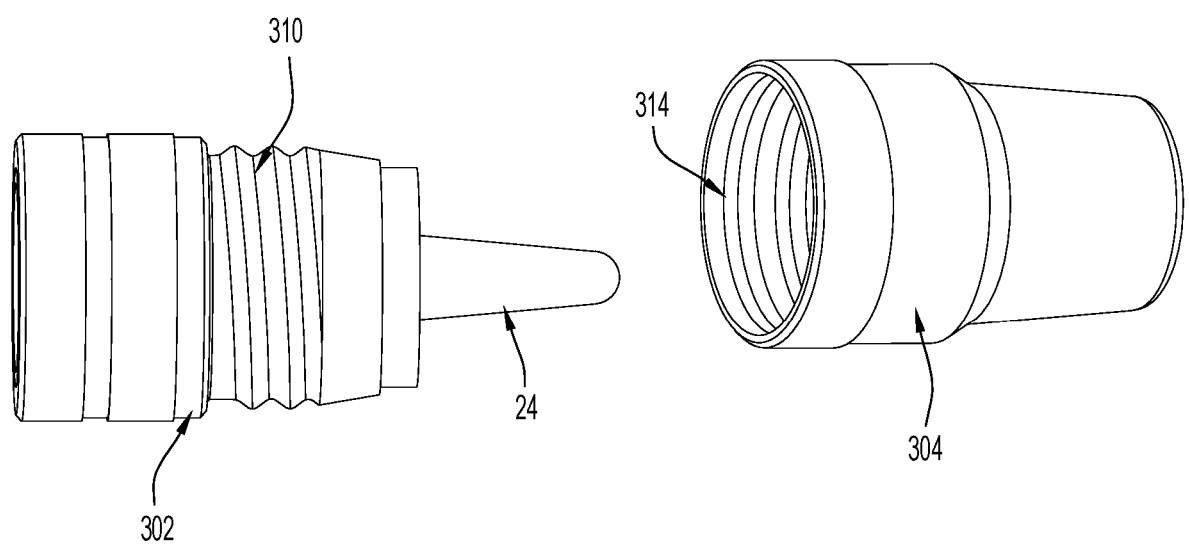
FIG. 13 an exploded view of the nozzle assembly of FIG. 10 having a contact tip secured within the base and constructed in accordance with the teachings of the present disclosure.

For example, the integral engagement means 222 may include a snap-fit design. Referring to FIG. 9, in another form the conduit liner 54 may include a cap 236 mounted/secured on the conduit liner 54. The cap 236 snaps into an undercut groove feature 238 within the internal cavity 58 of the contact tip 24.

In operation, the conduit liner 54 is secured with a consumable component 220 having a body defining an internal cavity 58 with integral engagement means 222. The user aligns the conduit liner 54 with the internal cavity 58 of the consumable component 220 over a distal end portion of the conduit liner 54. In one form, the user engages the distal end portion of the conduit liner 54 with the integral engagement means 222 of the consumable component 220. The conduit liner 54 is held in position by the integral engagement means 222 of the consumable component 220. The user in one form may thread the consumable component 220 onto the conduit liner 54. The user may further receive haptic feedback when the conduit liner 54 hits the stop surface 228. The stop surface 228 may be used to indicate the conduit liner 54 is properly positioned within the internal cavity 58 of the consumable component. However, it is appreciated that the conduit liner may extend various distances from the conductor tube depending on the consumable component utilized to secure the conduit liner 54 in position, in particular the geometry of the internal cavity of the contact tip 24.

Referring to FIGS. 10 through 13, a nozzle assembly 300 is provided in another form of the present disclosure. The nozzle assembly 300 is generally a two piece design that includes a base 302 and a nose 304. The base 302 is secured to the conductor tube (not shown) with a threaded engagement or may incorporated by a slip-on engagement. In one form, the base 302 includes an insulator 306 and a nozzle insert 308. (The base 302 with the nozzle insert 308 of the nozzle assembly secures the contact tip 46 into the spherical tapered seat of the conductor tube, as discussed below). The base 302 defines a distal threaded portion 310, and in one form, the threaded portion 310 has threads of an Edison Screw (ES) or other shell thread design. The thread geometry may also incorporate various modifications to assist with the alignment between the nose 304 and base 302 and reduce the likelihood of cross-threading. One possible modification is that the distal threaded portion 310 defines tapered Edison Screw threads, where a thread height shortens along the threaded portion toward a leading portion 312 of the base 302. The nose 304 defines a mating threaded portion 314 and is adapted to removably engage the distal threaded portion 310 of the base. The Edison Screw threads are beneficial in that they provide an air seal and also a tortuous path between the base 302 and nose 304 to reduce the possibility of air intrusion. Moreover, due to this generous thread size, thermal seizing of the nose 304 to the base 302 after high temperature operation may be reduced.

The two piece design allows the base 302 to secure the contact tip 46 in position, while the nose 304 is interchangeable, or removably secured to the base 302. The nose 304 can be easily changed for specific welding applications, or if weld spatter or other environmental conditions have damaged the nose 304 or a portion thereof. The nose 304 may vary in length, diameter, overall configuration, and interior geometry in various permutations of the present disclosure, in order to properly direct the shielding gas for a specific welding operation/application. Accordingly, the tapered design for the nose 304 as illustrated herein should not be construed as limiting the scope of the present disclosure.

The nose 304 can also be removed to allow for cleaning splatter and debris without having to remove the entire nozzle assembly 300, base 302 and contact tip 24 from the welding torch. Since the base 302 is a contact tip holder, the nose 304 can be removed to expose some of the contact tip 24, which is more clearly shown in FIG. 13. It is also contemplated that the exterior threaded portion 310 and interior threaded portion 314 may be on either the base or the nose (e.g., exterior threads on the nose 304 and interior threads on the base 302). It is also contemplated that various thread geometries and alignment features may be utilized, and thus the specific forms as illustrated and described herein should not be construed as limiting the scope of the present disclosure.

The consumable components are typically, rated to a duty cycle. The duty cycle is usually determined by the duration of the weld operation and the amperage used during continuous operation of the welding gun. For example, a light duty application may be considered to be those welding operations that are rated and use approximately 250 amperes and below. A medium duty application may be considered to be welding operations with a range from approximately 250 amperes to approximately 350 amperes, and a heavy duty application is generally 350 amperes and above.

The various forms of the present disclosure provide a simplified structure, more uniform heat distribution and improved cooling to increase consumable life, among other benefits. The various forms of the present disclosure further provide additional adjustments to a nozzle assembly, thereby allowing a consumable assembly to be adaptable for a wider variety of applications.

What is claimed is:

1. A nozzle assembly for a welding torch comprising:
a base for securing the nozzle assembly to a distal end portion of a conductor tube of the welding torch, the base defining a distal threaded portion, wherein the distal threaded portion has a tapered thread structure having a plurality of threads, wherein thread heights of the plurality of threads shorten along the distal threaded portion towards a leading portion of the distal threaded portion;
a nozzle insert provided along an interior surface of the base, the nozzle insert including a seating surface configured to engage a shoulder of a contact tip, wherein the contact tip includes an interior cavity for receiving a conduit liner, wherein a surface of the interior cavity non-threadably engages corresponding portions of conduit liner via a snap-fit; and
a nose defining a mating threaded portion adapted to engage the distal threaded portion of the base, thereby removably securing the nose to the base.

2. The nozzle assembly according to claim 1, wherein the distal threaded portion comprises tapered Edison threads.

3. The nozzle assembly according to claim 1, wherein the distal threaded portion provides an air seal and a tortuous path between the base and the nose in order to reduce air intrusion.

4. The nozzle assembly according to claim 1, wherein the base secures the contact tip into a position for operation of the welding torch.

5. The nozzle assembly according to claim 1, wherein the nose is interchangeable with another nose having a different length, diameter, configuration, or interior geometry selected to direct a shield gas in a welding operation.

6. The nozzle assembly according to claim 1, wherein the interior surface of the base includes an insulator.

7. An arc welding apparatus comprising:
a handle;
a conductor tube attached to the handle; and
a consumable assembly attached to the conductor tube, the consumable assembly comprising a contact tip and a nozzle assembly,
wherein the nozzle assembly comprises:
a base for securing the nozzle assembly to a distal end portion of the conductor tube, the base defining a distal threaded portion, wherein the distal threaded portion has a tapered thread structure having a plurality of threads, wherein thread heights of the plurality of threads shorten along the distal threaded portion towards a leading portion of the distal threaded portion;
a nozzle insert provided along an interior surface of the base, the nozzle insert including a seating surface engaged with a shoulder of the contact tip, wherein the contact tip includes an interior cavity for receiving a conduit liner, wherein a surface of the interior cavity non-threadably engages corresponding portions of conduit liner via a snap-fit; and
a nose defining a mating threaded portion adapted to engage the distal threaded portion of the base, thereby removably securing the nose to the base.

8. The arc welding apparatus according to claim 7, wherein the distal threaded portion comprises tapered Edison threads.

9. The arc welding apparatus according to claim 7, wherein the distal threaded portion provides an air seal and a tortuous path between the base and the nose in order to reduce air intrusion.

10. The arc welding apparatus according to claim 7, wherein the base secures the contact tip into a position for operation of the arc welding apparatus.

11. The arc welding apparatus according to claim 7, wherein the nose is interchangeable with another nose having a different length, diameter, configuration, or interior geometry selected to direct a shield gas in a specific welding operation.

12. The arc welding apparatus according to claim 7, wherein the interior surface of the base includes an insulator.

13. The arc welding apparatus according to claim 7, wherein the interior cavity of the contact tip further includes a stop surface to stop the contact tip from further engaging the conduit liner.

14. The arc welding apparatus according to claim 7, wherein the conductor tube includes a distal end portion that has an outer surface, the outer surface includes two opposing flat surfaces.

15. The arc welding apparatus according to claim 14, further comprising a sleeve disposed at the distal end portion of the conductor tube,
wherein at least one of the two opposing flat surfaces of the conductor tube includes a threaded opening that receives a first set screw to secure the sleeve to the conductor tube.

16. The arc welding apparatus according to claim 15, wherein the sleeve includes a threaded aperture that receives a second set screw to clamp the conduit liner.

* * * * *